No. 667,894. Patented Feb. 12, 1901.
W. A. J. SIMPSON.
QUEEN BEE TRAP.
(Application filed Sept. 6, 1900.)
(No Model.) 2 Sheets—Sheet 1.

Witnesses
Inventor
Wm. A. J. Simpson
By Victor J. Evans
Attorneys

No. 667,894. Patented Feb. 12, 1901.
W. A. J. SIMPSON.
QUEEN BEE TRAP.
(Application filed Sept. 6, 1900.)
(No Model.) 2 Sheets—Sheet 2.

Witnesses
Inventor
Wm. A. J. Simpson
By Victor J. Evans
Attorneys

UNITED STATES PATENT OFFICE.

WILLIAM A. J. SIMPSON, OF GALLATIN, TENNESSEE.

QUEEN-BEE TRAP.

SPECIFICATION forming part of Letters Patent No. 667,894, dated February 12, 1901.

Application filed September 6, 1900. Serial No. 29,212. (No model.)

*To all whom it may concern:*

Be it known that I, WILLIAM A. J. SIMPSON, a citizen of the United States, residing at Gallatin, in the county of Sumner and State of Tennessee, have invented new and useful Improvements in Queen-Bee Traps, of which the following is a specification.

This invention relates to new and useful improvements in queen-bee traps especially adapted for use in beehives of ordinary construction; and its primary object is to provide a device of simple construction which is adapted to entrap the queen bee, so that it may be readily conveyed from the old to a new hive.

A further object is to provide a device of this character which will not injure the bee nor permit the same to escape accidentally.

To these ends the invention consists in the further novel construction and combination of parts hereinafter more fully described and claimed and illustrated in the accompanying drawings, showing the preferred form of my invention, and in which—

Figure 1:
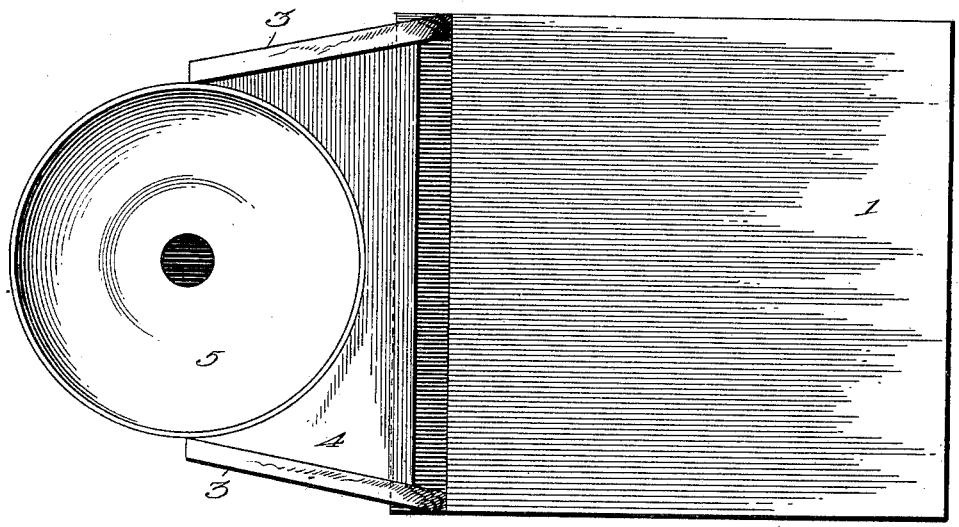
Figure 2:
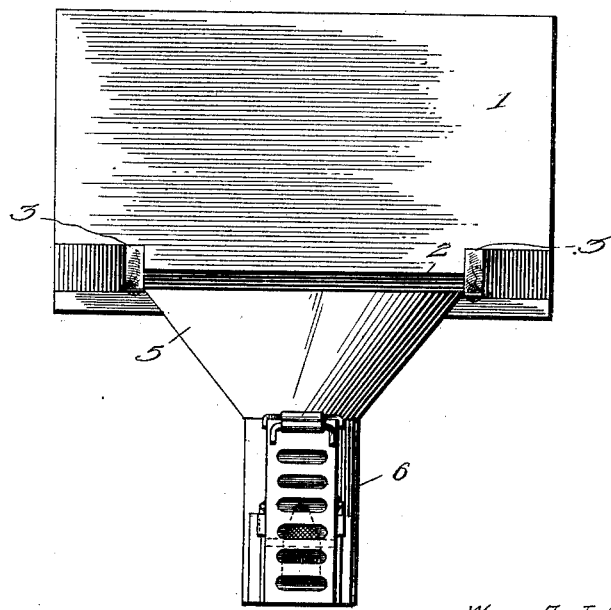
Figure 3:
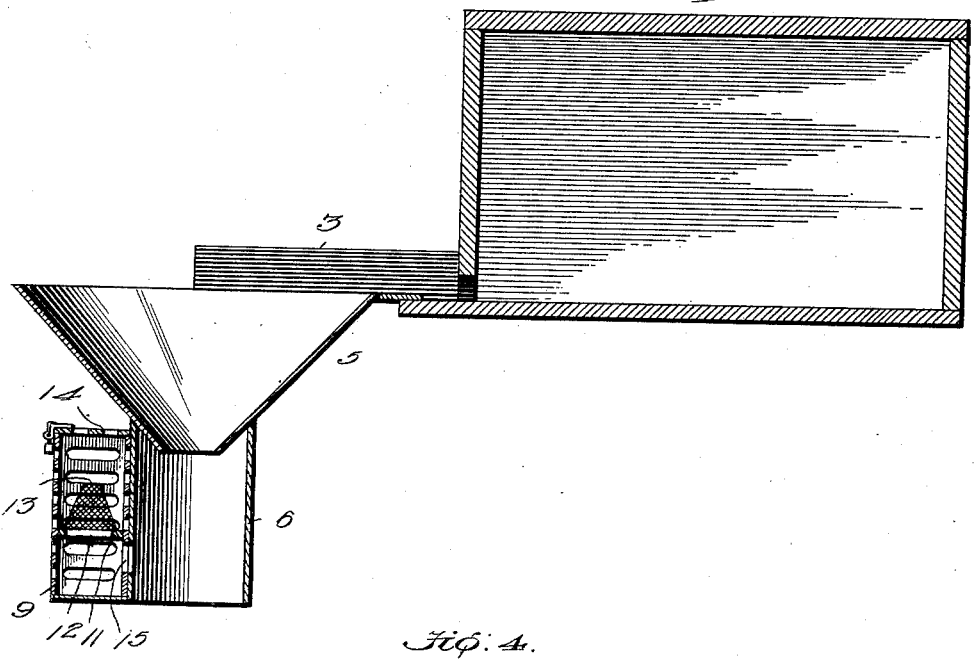
Figure 4:
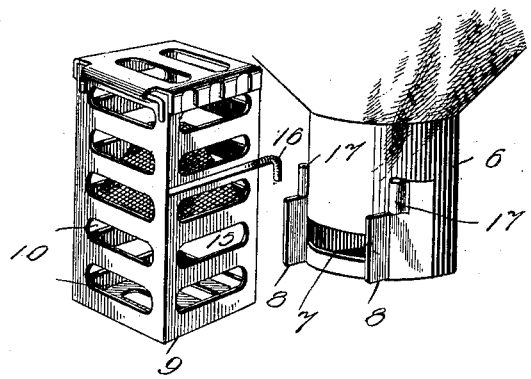

Figure 1 is a top plan view of the device. Fig. 2 is an end elevation. Fig. 3 is a longitudinal section. Fig. 4 is a detailed view of the cage and funnel detached.

Referring to these figures by numerals of reference, 1 is the hive, formed of any suitable material, as wood, and having an outlet at 2. Arms 3 extend longitudinally from this outlet at opposite sides of a platform 4, which extends the full length of the outlet and is provided at its opposite edge with a funnel 5, the upper edge of which is level with said platform. This funnel is provided at the bottom with a tubular stem 6, the lower end of said funnel extending into the upper end of the tube, as shown in Fig. 3. An aperture 7 is formed within one side of the cylinder 6, and flanges 8 extend from the ends of this aperture and are adapted to lie at opposite sides of a cage 9. The cage is formed, preferably, of metal, having apertures 10 therein of sufficient size to permit the exit of all but the queen bee. A partition 11 is arranged transversely in the cage and has an aperture 12 therein, above which is arranged a wire-gauze cone 13, having an outlet at the top thereof into the upper portion of the cage. A hinged cover 14 is arranged at the top of the cage to permit the ready removal of the bee. An opening or inlet 15 is arranged within one side of the cage near the bottom thereof and is adapted to register with the aperture 7 in the cylinder. Hooks 16 extend from opposite sides of the cage and engage loops 17, formed above the flanges 8.

The queen bee emerges through the opening 2 and as its wings are clipped it cannot leave the platform 4. As the bee continues outward it will fall into the funnel 5 and drop into cylinder 6. The bee cannot pass upward from said tube and will therefore pass out to the cage 9 through apertures 7 and 15. The bee will then crawl up a wall into the cone 13 and thence into the upper compartment, from which it cannot escape. The cage may then be removed by lifting the same upward until the hooks 16 are disengaged from the loops 17.

In the foregoing description I have shown the preferred form of my invention; but I do not limit myself thereto, as I am aware that modifications may be made therein without departing from the spirit or sacrificing the advantages thereof, and I therefore reserve the right to make all such changes as fairly fall within the scope of my invention.

Having thus fully described my invention, what I claim as new, and desire to secure by Letters Patent, is—

1. The combination with a funnel having a tube at the bottom thereof; of loops to said tube; a cage having an aperture therein adapted to register with an aperture in the tube; hooks to the cage engaging the loops; a gauze cone extending transversely of the cage; and a hinged cover to said cage.

2. The combination with a hive; of a platform arranged in front of the outlet from said hive; a funnel within the platform; a tube extending downward from, and inclosing the lower end of the funnel; a cage having an aperture therein adapted to register with an opening in the tube; hooks to said cage; loops upon the tube adapted to receive said hooks; flanges upon the tube at opposite sides of the cage; a gauze cone within the cage above the inlet thereto; and a hinged cover to the cage.

3. The combination with a funnel having a tube at the bottom thereof, of loops to said tube, flanges to the tube, and a cage between the flanges and detachably secured to the loops, said cage communicating with the interior of the tube.

4. The combination with a funnel having a tube at the bottom thereof, of a cage detachably secured to, and communicating with the interior of, the tube, and a cone within the cage having an opening therein.

5. The combination with a tube, of a funnel projecting into one end thereof, a cage detachably secured to, and communicating with the interior of, the tube, a partition within the cage having an opening therein, and a cone upon the partition and about the opening.

In testimony whereof I affix my signature in presence of two witnesses.

WILLIAM A. J. SIMPSON.

Witnesses:
J. B. PEYTON,
B. F. ALLEN.